United States Patent [19]

Barnhart et al.

[11] Patent Number: 4,905,960

[45] Date of Patent: Mar. 6, 1990

[54] SOLENOID VALVE STROKE ADJUSTMENT LOCKING MECHANISM AND METHOD OF FORMING THE SAME

[75] Inventors: Brett Barnhart, Franklin; Al Slachter, Columbus, both of Ind.

[73] Assignee: Cummins Engine Company, Inc., Columbus, Ind.

[21] Appl. No.: 281,514

[22] Filed: Dec. 8, 1988

[51] Int. Cl.⁴ ......................... F16K 1/48; F16K 31/06

[52] U.S. Cl. ............................... 251/129.18; 251/356; 251/357

[58] Field of Search .................... 251/129.18, 356, 357

[56] References Cited

U.S. PATENT DOCUMENTS

| | | | |
|---|---|---|---|
| 2,247,099 | 6/1941 | Rice | 251/357 X |
| 3,368,791 | 2/1968 | Wells | 251/129.18 X |
| 4,530,486 | 7/1985 | Rusnak | 251/129.18 X |

*Primary Examiner*—Arnold Rosenthal

*Attorney, Agent, or Firm*—Sixbey, Friedman, Leedom & Ferguson

[57] ABSTRACT

A valve stroke adjustment locking mechanism comprising a valve seat having an axially extending bore therethrough and a seating surface. A valve operator is provided having an elongated member which is extended through the axial bore and is reciprocatable between a first open position and a second closed position. The elongated member includes a threaded end portion which extends from the valve seat for accommodating a valve assembly which is provided with a top portion forming a sealing face and a bottom portion having a central opening adapted to receive the threaded end portion of the elongated member. A closed end nut threadingly engages the threaded end portion of the elongated member and contacts the valve assembly for positioning the sealing surface a predetermined spacing from the seating surface. A transverse hole is then electromechanically discharge machined transversely through the closed end nut and the threaded end portion of said piston member and a pressure fit pin is forced into the hole to rigidly fix the closed end nut relative to the elongated member in order to maintain the predetermined spacing without forming any paths of leakage.

10 Claims, 4 Drawing Sheets

SOLENOID VALVE STROKE ADJUSTMENT LOCKING MECHANISM AND METHOD OF FORMING THE SAME

TECHNICAL FIELD

This invention relates to fluid valves and, more particularly, to solenoid operated valves having adjustment mechanisms for adjustably fixing the length of stroke between fully open and fully closed valve positions.

BACKGROUND OF THE INVENTION

Solenoid operated two-way valves are well known in the prior art and, more particularly, valves of this type are known to be used to control the flow of fuel into a timing chamber of an electronically controlled unit injector to permit control over both the quantity and timing of fuel injected into the combustion chamber of an internal combustion engine.

U.S. Pat. No. 4,431,160 issued to Burt et al discloses such an electrically operated valve for use in unit injectors of the type illustrated in U.S. Pat. No. 4,281,792. The '160 valve includes a cup shaped valve element universally mounted on a stem operator for movement between open and closed positions. A spring element biases the operator toward the valve open position. An armature, mounted on the stem operator opposite the valve element is selectively attracted toward the stator of a solenoid to cause the valve element to move to its closed position whenever the solenoid coil is energized. Valves of the type disclosed in the '160 patent are required to operate at very high speed (fully open and fully closed in 2.5 seconds) and must operate to block fluid at very high pressure (25–30,000 psi). To achieve this very high speed, the '160 cup shaped valve element must be arranged close to the valve seat as possible while providing adequate flow volume capacity. Such requirements necessitate extremely accurate positioning of the valve element relative to its valve seal.

When closed, valves of the type disclosed is the '160 patent must create a very tight seal and thus the valve element is mounted by a self-aligning assembly. To allow for the accurate adjustment noted above, the self-aligning assembly includes a nut threadingly engaged with the stem operator so as to properly position the valve element. The nut includes an upper spherically shaped surface which is in constant contact with a conically shaped lower surface of the cup-shaped valve element. The axial spacing between the valve element and the valve seat defines the stroke length of the valve and it is critical that this spacing be maintained at a predetermined optimum value. Fluctuation in this spacing of as little as 0.002 inches can affect the metering and timing of the injector and may eventually result in unacceptable performance of the injector, necessitating expensive repair. This fluctuation arises due to repeated impacts caused by reciprocation of the valve element between its open and closed positions.

Therefore, it is essential that the nut, which retains the cup-shaped valve element of the valve, be fixed in its predetermined optimum position and that this position be maintained throughout the life of the injector. In the above mentioned U.S. Pat. No. 4,431,160, it is the internal threads which are relied upon to act on the nut to hold the nut in place. This, however, has not been found to be reliable due to the above-mentioned constant reciprocation of the cap and nut. During this constant reciprocation, the valve will vibrate, which, in turn, will cause the adjustment nut to slip or rotate, thereby deviating from the preset optimum position which may result in failure of the valve and costly repairs.

One solution to the above-mentioned problem is that shown in FIG. 4 of the drawings. FIG. 4 illustrates a solenoid operated control valve 102 for controlling the flow of fuel essentially identical to that disclosed above. Here, however, it should be noted that the adjustment nut 104 is of a two-piece construction. The first piece being a through hole nut 106, open at both ends, which threadingly receives the stem member 108, and a circular cap 110 including a blade 112 which extends into a cooperating slot 114 formed in the end of the piston. Once the through hole nut 106 is set in its predetermined position, the cap 110 is welded thereon so as to mate the blade 112 within the cooperating slot 114 to restrain the nut from rotating relative to the piston. However, in practice, the blade and slot design includes built in clearances which must be provided so as to allow the blade to be inserted into the slot. Such clearances immediately result in fluctuations in the stroke, and repeated actuation of the valve gradually deteriorates this arrangement to a point where the stroke shift reaches an unacceptable value and results in failure of the injector. Such a design may al o lead to unnecessary leakage due to either failure of the weld or an initial imperfect weld.

In addition to the problems associated with the clearances discussed above, during the welding process, excessive amounts of heat may be generated, resulting in the undesirable expansion and contraction of the metallic members of the valve. This expansion and contraction can result in a change in the optimum positioning of the valve closure element, a change which may be greater than 0.002 inches which can lead to critical inaccuracies in the injector.

The plunger assembly disclosed in U.S. Pat. No. 3,820,213 issued to Kent includes a shaft having a stem formed of a plastic or rubber-like material inserted therein. The stem is inserted into the shaft until a seat abuts against the end of the shaft and to secure the stem to the shaft a diametrical hole is drilled through the shaft and the stem for the insertion of a pin. The stem is later positioned in place on the seating surface and subjected to a temperature of 130° C. which causes the tip of the stem to form to that shape of the seating face. The pin is provided merely to maintain the axial placement of the stem within the plunger. Neither the stem, plunger or pin are subjected to excessive internal pressures, nor is the maintenance of the positioning of the stem relative to the plunger critical in this environment.

A piston and rod assembly is disclosed in U.S. Pat. No. 3,489,442 issued to Wright and includes a first rod which is threaded part way into one end of a threaded axial bore in a piston and a second rod which is threaded into the other end of the axial bore of the piston until it contacts the first rod. At this point, a predetermined torque is applied to one of the rods, urging the ends of the rods into engagement with each other, which, in turn, prestresses the threads on the first and second rods against the threads of the threaded axially bore. To prevent movement of one of the rods relative to the other and relative to the piston, a transversely extending hole is drilled through the piston at a point where the hole will intercept the intersection of the first and second rods and a pin is inserted into this hole to prevent any relative rotational movement. Again, neither the rods nor the pins are subjected to internal pressures, nor is the positioning of the piston critical in this environment to the point where a fluctuation of 0.002 inches can result in failure of the assembly.

Clearly, there is the need for an adjustment and locking mechanism which will both accurately and reliably position a fluid valve closure element in a predetermined optimum position, and do so without resulting in any leakage of fluid from within the assembly.

SUMMARY OF THE INVENTION

In view of the foregoing, it is an object of the present invention to provide an accurate and reliable means for locking the stroke adjustment nut of a fluid valve in its predetermined optimum position and, therefore, avoid costly repairs and replacement.

It is a further object of the present invention to avoid thread wear which may occur between the adjustment nut and the valve stem operator due to the constant reciprocation of the valve stem operator, in order to provide a maintenance free stroke adjustment assembly.

Another object of the present invention is to provide a simple and reliable method for maintaining the adjustment assembly in its predetermined position.

It is yet another object of the invention to provide a means of locking the adjustment nut of a valve for use in controlling the timing and quantity of fule injected by an injector assembly so as to withstand excessive internal pressures which are exerted thereon without creating any paths of leakage in or around the adjustment nut.

These, as well as other objects of the present invention, are achieved by providing a valve stroke adjustment locking mechanism comprising a valve seat having an axially extending bore therethrough and a seating surface. A valve stem operator is extended through the axial bore and is reciprocal between first and second positions corresponding to the opened and closed positions of the valve. The valve stem operator includes a threaded end portion which extends from the valve seat. A valve element is provided which is movable between the opened position, allowing fluid to pass between the valve seat and the valve element and the closed position sealing the valve element against the valve seat. The valve stem operator is connected to the valve element to move this element between the opened and closed positions by way of an solenoid. A closed end nut which threadingly engages the extending portion of the valve stem operator is positioned such that a predetermined spacing between the sealing surface of the valve element and the valve seat is obtained, this being the position of the valve element in the opened condition. In order to maintain the positioning of the closed end nut, a transverse hole is electromechanically discharge machined through the closed end nut and the extending portion of the valve stem operator. A pin is then press fitted into this hole, such that the closed end nut is rigidly fixed relative to the valve stem operator. By press fitting this pin into the transverse hole, a pressure tight seal may be reliably formed such that no leaking occurs during the use of the valve.

These and other advantages of the present invention will become apparent from the figures in the following description of the preferred embodiment.

DETAILED DESCRIPTION OF THE PREFERRED EMBODIMENT

Figure 1:
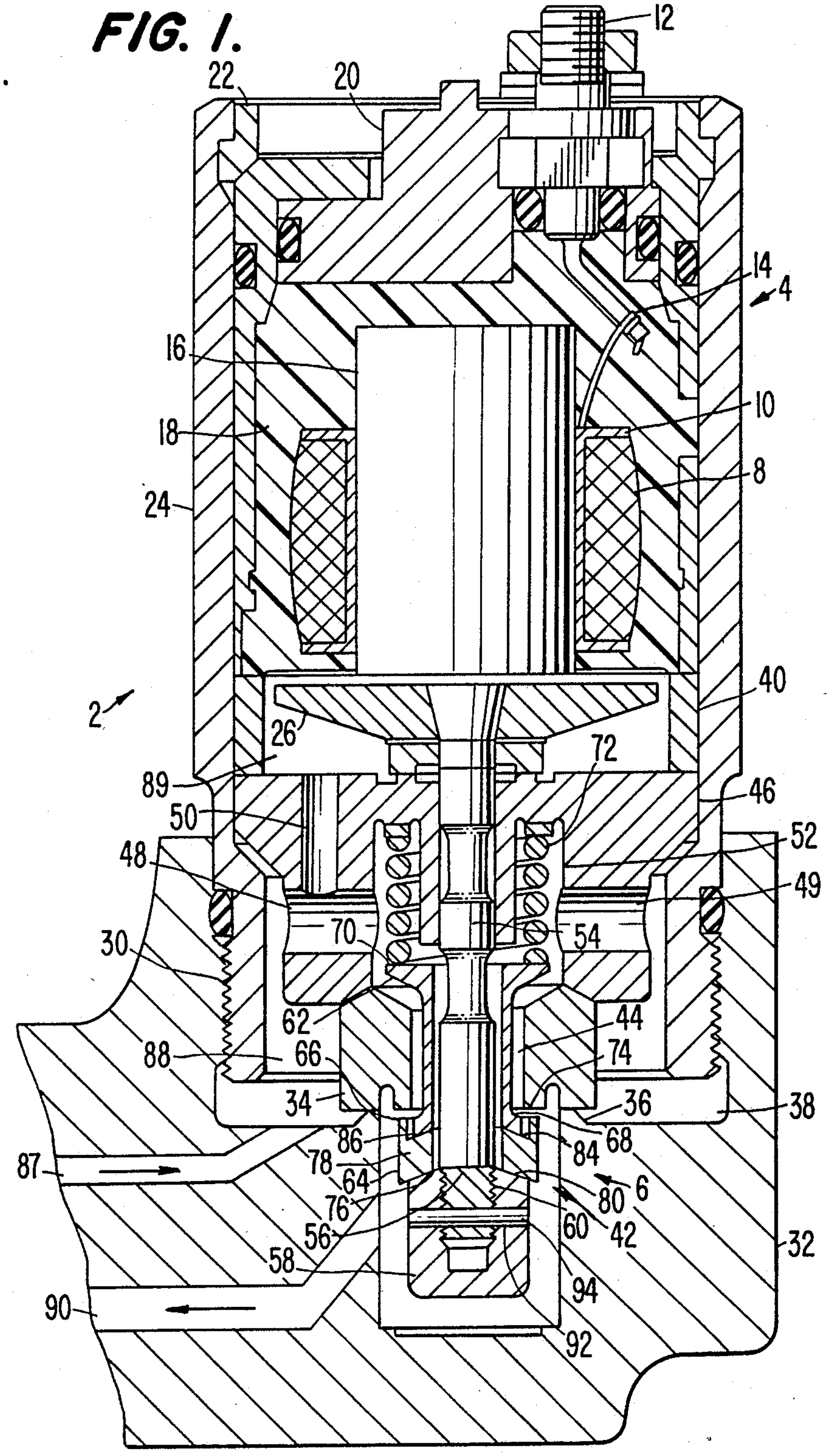
FIG. 1 is a cross-sectional elevational view of the injector assembly in the opened condition in accordance with the preferred embodiment of the invention.
Figure 3A:
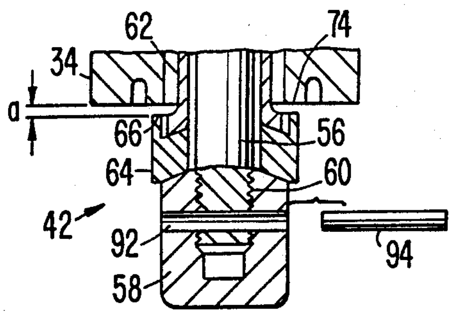
FIG. 3*a* is a cross-sectional view of the adjustment nut locking assembly prior to the insertion of the pressure fit pin.
Figure 3B:
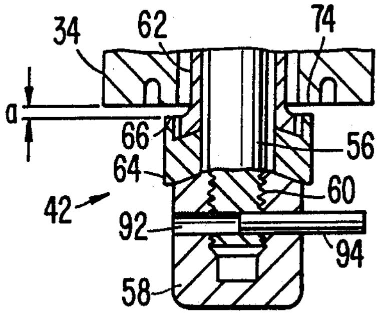
FIG. 3*b* is a cross-sectional view of the adjustment nut locking assembly with the pressure fit pin in the partially inserted position.
Figure 3C:
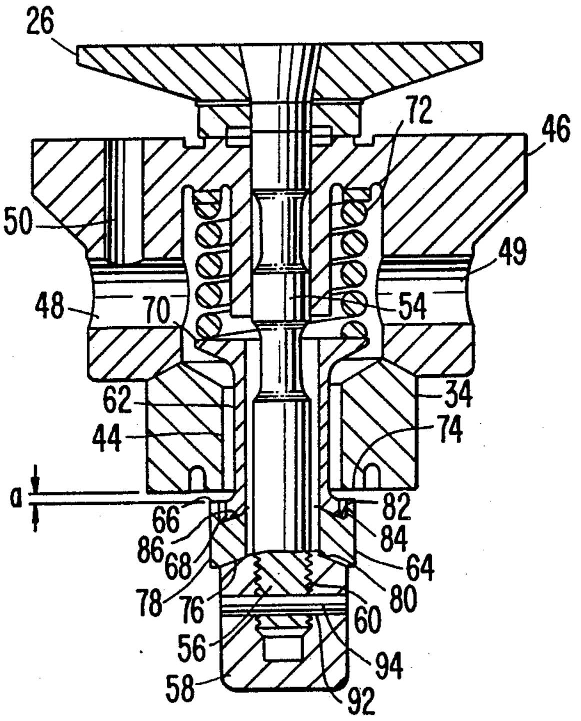
FIG. 3*c* is a cross-sectional view of the adjustment nut locking assembly in the opened condition having the pressure fit pin fully inserted.
Figure 4:
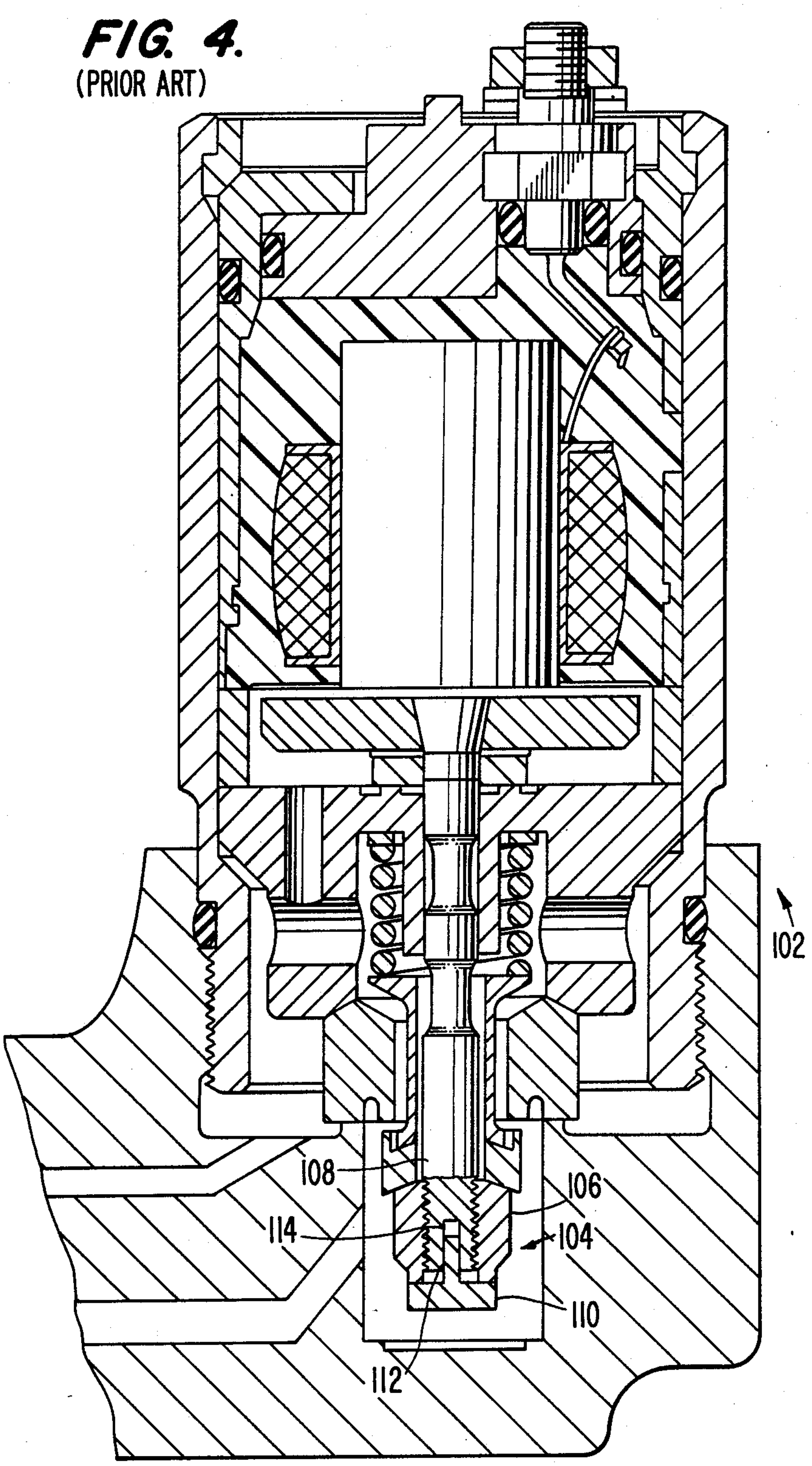
FIG. 4. (PRIOR ART)
FIG. 4 is a cross-sectional elevational view of the injector assembly previously described as the prior art.

FIG. 1 of the drawings illustrates the solenoid operated valve 2 formed of generally two sections. The first being a stator 4 illustrated in the upper section of FIG. 1 and the other being a mechanical valve 6, shown in the lower section of FIG. 1 and independently in FIG. 3*c*. The stator 4 is of the conventional form set forth above in the prior art and therefore will be only discussed briefly herein. The stator 4 includes a coil 8 encircling a spool 10. Electrical energization of coil 8 is supplied through element 12 and line 14 to the coil 8. The spool 10 circumscribes a laminate core 16 and is encased in an epoxy packing 18. Element 12 is secured within plate 20 and securing ring 22 further secures the entire assembly within the housing 24.

Figure 2:
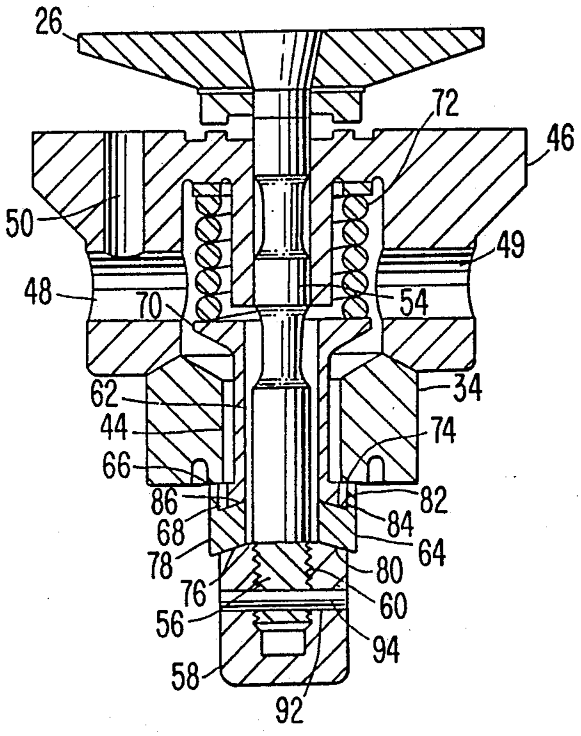
FIG. 2 is a cross-sectional elevational view of the valve portion of the injector assembly in the closed condition in accordance with the preferred embodiment of the invention.

In operation, energization of the coil 8 creates a magnetic field which attracts an armature 26 of the mechanical valve 6 to selectively move the valve from an opened condition shown in FIG. 1, to a closed condition shown in FIG. 2.

The housing 24 includes a threaded end portion 30 which is threadingly received by the injection apparatus 32. The threaded end portion of the housing 30 accommodates the mechanical valve 6. When the housing 24 is inserted within the injection apparatus 32, a valve seat 34 of the mechanical valve 6 abuts a ridge 36 provided in the receiving bore 38 of the injection apparatus 32. In doing so, the mechanical valve 6 is forced against the spacer 40 which maintains the armature 26 spaced from the stator 4.

The mechanical valve 6 embodies an important feature of the subject invention, namely an adjustment and locking mechanism 42. The mechanical valve 6 includes the previously mentioned valve seat 34 having an axial bore 44 extending therethrough. A valve body member 46 is provided between the valve seat 34 and the spacer 40. This valve body member includes flow passages 48, 49 and 50 and has an axial bore 52 extending coaxially with the axial bore 44. Each of the bores 44 and 52 receive a stem operator in the form of a piston member 54 therein which is attached at one end to the armature 26 and is provided at its other end with a threaded extending portion 56.

The stroke adjustment and locking mechanism 42 includes a closed end acorn nut 58 which is provided with internal thread 60 which threadingly receives the threaded extending portion 56 of the piston member 54. A preload spacer 62 and an intermediately positioned hollow shaped cap 64 having a circumferential sealing face 66 are concentrically located about the piston member 54. An end 68 of the preload spacer extends outwardly from the axial bore 44 of the valve seat 34, while the other end 70 of the preload spacer 62 extends within the axial bore 52 of the body member 46. A spring 72 is maintained in contacting engagement with the end 70 of the preload spacer 62 so as to resiliently bias the valve in the opened condition as is shown in FIG. 1.

In order to insure complete circumferential contact between the seating surface 74 of the valve seat 34 and the sealing face 66, the mechanical valve 6 is provided with a self-aligning means. This self-aligning means is formed between the acorn nut 58, the cup shaped cap 64 and the preload spacer 62. The acorn nut 58 includes an upper spherically shaped surface 76, and the cup shaped cap 64 is rotatably and slidably positioned between the acorn nut 58 and the preload spacer 62. The bottom 78 of the cup shaped cap 64 is provided with a conically shaped outer surface 80 which insures a continuous line of contact between itself and the spherical surface 76 of the acorn nut 58, and an inner portion 82 of the bottom of the cup shaped cap 78 includes a spherical contact surface 84 which forms a continuous line contact with a conical shaped lower surface 86 of the preload spacer 62. Therefore, if the axis of the piston member 54 and the axis of the bore 44 of the valve seat become skewed relative to one another, continuous contact will be maintained between the members of the stroke adjustment and locking mechanism 42, resulting in a leak free coupling.

Referring now to the fuel flow within the mechanical valve 6, a fuel supply line 87 supplies fuel to an accumulation chamber 88 within a lower portion of the housing 24. The fuel m ay then flow into the valve assembly through flow passages 48 and 49. The flow passage 50 is provided between the flow passage 48 and the armature cavity 89 to neutralize the pressures therebetween so as to allow for the free movement of the armature 26. When the mechanical valve 6 is in the opened condition as shown in FIG. 1, the fuel will be permitted to flow outward through the spacing provided between the valve seat 34 and the sealing face 66 and through the output line 90 to the timing chamber of the injection apparatus.

The spacing between the sealing face 66 and the valve seat 34 is designated by a dimension a shown in FIGS. *3a–3c*. This spacing a is the predetemined valve stroke and is the critical dimension for the effective and efficient operation of the injector. A deviation from this predetermined valve stroke of less than 0.002 inches affects the metering and timing of the injector, and a stroke shift in excess of this amount can eventually result in injector malfunction. It is this stroke length a in which the stroke adjustment and locking mechanism 42 is designed to maintain. The stroke length a is initially set by concentrically positioning the cup shaped cap 64 about the piston member 54 and threading the acorn cup 58 onto the threaded end portion of the piston member 54 a sufficient distance to achieve the selected stroke length. Once this stroke length is set at its predetermined optimum value, the acorn nut 58 is permanently secured to the piston member 54. To do so, a 1.0 millimeter diameter through hole 92 is electromechanically discharge machined transversely through the acorn nut 58 and the piston member 54. The process of electromechanical discharge machining or electron beam hole drilling is a well known process for forming small and extremely accurate holes in a metal work piece. A device of this type is disclosed in U.S. Pat. No. 4,484,058 issued to Howard et al. The accuracy of this through hole 92 is essential to avoid any leakage at this point, therefore, desirably, the hole is electromechanically discharge machined rather than conventionally drilled. After the through hole 92 is formed, a press fit pin 94 is forced into the hole 92 to lock the acorn nut 58 in position on the piston member 54. Since the pin 94 is press fit into the hole 92, there are no clearances associated therewith, and a seal capable of withstanding internal pressures in excess of 20,000 psi is formed between the acorn nut 58 and the pin 94, thus preventing any leakage.

In situations where a mechanical press fit is relied upon to form a leak free connection, it is typically desirable to provide a large differential in size between the interfering parts to insure that the interference fit is extremely tight. In the present circumstance, however, a large oversize differential might have the effect of distorting the stroke adjustment. By using electromechanical discharge machining, hole 92 can be formed very small and highly accurate in size thereby permitting the selection of pin 94 to be within a range which is only slightly larger than the hole 92. With only a limited difference in diameter between hole 92 and pin 94 the amount of distortion due to the interference fit can be minimized.

This locking mechanism permits no relative movement between the acorn nut 58 and the piston member 54 and, therefore, permanently and reliably fixes the stroke length of setting at the required predetermined optimum value. In doing so, a portion of the injector performance variability presently being experienced can be eliminated.

While the invention has been described with reference to a preferred embodiment, it should be appreciated by those skilled in the art that the invention may be practiced otherwise than as specifically described herein without departing from the spirit and scope of the invention. It is, therefore, understood that the spirit and scope of the invention be limited only by the appended claims.

INDUSTRIAL APPLICABILITY

The adjustment locking mechanism and process of forming the same may be employed in any environment where it is essential that an adjustment nut not move the slightest amount relative to a reciprocating member to which it is applied. This particular locking mechanism is even more appropriate with the existence of high pressures where the possibility of leakage is present. Application of this mechanism may be utilized in any environment where it is essential to regulate the flow of gas or a liquid f rom a source to a recipient.

We claim:

1. A control valve comprising:

a valve seat;

a valve element having a central bore and movable between an open position allowing fluid to pass through said valve seat and a closed position in sealing engagement with said valve seat;

a valve operation means for moving said valve element between said open and closed positions including an elongated reciprocable member extending through said central bore;

valve adjustment and sealing means for adjustably mounting said valve element relative to said valve operator to permit adjustment to within an acceptable tolerance of a predetermined distance between said valve element and said valve seat when said valve element is in its open position without creating a path of leakage when said valve element is in its closed position; and valve adjustment locking means for locking said adjustment and sealing means in its adjusted position without creating a path of leakage.

2. The control valve as defined in claim 1, wherein said valve operator includes an electronically controlled solenoid.

3. The control valve as defined in claim 1, wherein said acceptable tolerance is ±0.002 inches.

4. The control valve as defined in claim 1, wherein said elongated reciprocable member includes a threaded end portion which extends through said central bore and said adjustment and sealing means includes a closed end nut which threadingly engages said threaded end portion to position said valve element in a predetermined position said predetermined distance from said valve seat.

5. The control valve as defined in claim 4, wherein said valve adjustment locking means includes a pressure fit pin which is forceably secured within a transverse through hole formed in said closed end nut and said threaded end portion after said valve element is positioned in said predetermined position.

6. The control valve as defined in claim 5, wherein said through hole is electromechanical discharge machined.

7. The control valve as defined in claim 5, wherein said pressure fit pin is of a greater diameter than said through hole and forms a pressure tight seal within said through hole.

8. The control valve as defined in claim 4, further comprising a self aligning means including a preload spacer having an upper surface and a conically shaped bottom surface and a central opening for accommodating said elongated member, with said nut including a spherically shaped upper surface in contact with a lower conically shaped surface of said bottom portion of said valve means, and an upper spherically shaped surface of said bottom portion in contact with said conically shaped bottom surface of said preload spacer, and a biasing means for biasing said preload spacer toward said nut to maintain said surfaces in contact.

9. A valve stroke adjustment locking mechanism comprising a valve seat having an axially extending bore therethrough and a seating surface, a valve operator, an elongated member extending through said axial bore and being reciprocatable between a first open position and a second closed position, said elongated member having a threaded end portion extending from said valve seat, a valve element having a top portion forming a sealing surface and a bottom portion having a central opening adapted to accommodate said threaded end portion of said elongated member, a closed end nut for threadingly engaging said threaded end portion of said elongated member and contacting said valve element for positioning said sealing surface a predetermined distance from said seating surface, a transverse hole extending through said closed end nut and said threaded end portion of said elongated member, and a pin positioned in said hole for rigidly fixing said closed end nut relative to said elongated member to maintain said predetermined spacing.

10. A valve stroke adjustment locking mechanism as defined in claim 9, wherein said transverse hole is formed by electromechanical discharge machining after said closed end nut has positioned said sealing surface said predetermined distance from said seating surface.

* * * * *